(12) United States Patent
Nozawa

(10) Patent No.: US 7,019,920 B2
(45) Date of Patent: Mar. 28, 2006

(54) IMAGE-FORMATION OPTICAL SYSTEM, AND IMAGING SYSTEM INCORPORATING THE SAME

(75) Inventor: Toshihide Nozawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 10/893,234

(22) Filed: Jul. 19, 2004

(65) Prior Publication Data
US 2005/0036217 A1 Feb. 17, 2005

(30) Foreign Application Priority Data
Jul. 17, 2003 (JP) .............................. 2003-275853

(51) Int. Cl.
*G02B 9/04* (2006.01)
(52) U.S. Cl. ..................................... 359/793
(58) Field of Classification Search ............... 359/646, 359/691, 708, 717, 738, 793, 794
See application file for complete search history.

(56) References Cited

U.S. PATENT DOCUMENTS

| 5,739,965 | A | 4/1998 | Ohno |
| 6,181,477 | B1 | 1/2001 | Okajima |
| 6,577,456 | B1 | 6/2003 | Sato |
| 2003/0081330 | A1 | 5/2003 | Do et al. |
| 2003/0117723 | A1 | 6/2003 | Shinohara |

FOREIGN PATENT DOCUMENTS

| JP | 05-150172 | 6/1993 |
| JP | 2001-183578 | 7/2001 |
| JP | 2002-267928 | 9/2002 |
| JP | 2004-062014 | 2/2004 |

*Primary Examiner*—Georgia Epps
*Assistant Examiner*—Alicia M Harrington
(74) *Attorney, Agent, or Firm*—Kenyon & Kenyon

(57) ABSTRACT

An imaging optical system that is of a small-format size yet capable of easily securing a back focus, and an imaging system that incorporates the same has only two lenses, specifically, a first meniscus lens L1 convex on its object side and a second lens L2 having positive refracting power and a convex surface configured such that the absolute value of the curvature of the object side-surface of the second lens is larger than the absolute value of the curvature of image side-surface of the second lens. An aperture stop S is located on the object side of an image-formation lens arrangement. A first condition concerning the focal length ratio between the first meniscus lens L1 and the second lens L2 and a second condition concerning the shape factor of an air lens between the first meniscus lens L1 and the second lens L2 are satisfied.

20 Claims, 9 Drawing Sheets

| Spherical aberrations | Astigmatism | Distortion | Chromatic aberration of magnification |
|---|---|---|---|
| FNO. 2.8 | ω 31.8° | ω 31.8° | ω 31.8° |

IMAGE-FORMATION OPTICAL SYSTEM, AND IMAGING SYSTEM INCORPORATING THE SAME

This application claims the benefits of Japanese Application No. 2003-275853 filed in Japan on Jul. 17, 2003, the contents of which are herein incorporated by this reference.

BACKGROUND OF THE INVENTION

The present invention relates generally to an imaging optical system and an imaging system that incorporates the same, and more specifically to a small-format phototaking optical system that relies on a solid-state image pickup device such as a CCD or CMOS. For instance, the invention is concerned with a phototaking optical system that can be utilized for digital still cameras, digital video cameras, miniature cameras mounted on cellular phones and personal computers, and surveillance cameras or the like.

In recent years, electronic cameras using solid-state image pickup devices such as CCDs or CMOSs to photo-object subject images have come into wide use in place of silver-halide film cameras. For imaging systems mounted on portable computers, cellular phones, etc. among those electronic cameras, size and weight reductions are now especially demanded. For an imaging system mounted on recently developed cellular phones, there is a growing demand toward an imaging optical system having performance high enough to take at least VGA class photographs (310,000 pixels).

For an optical system used with such imaging systems, there have been proposed numerous optical systems that are each composed of as few as two lenses yet that can have the VGA class capability by use of aspheric surfaces and achieve cost and weight reductions by use of plastic lenses.

Referring to an electronic image pickup device such as a CCD, on the other hand, as off-axis light beams leaving an imaging optical system are incident on an image plane at too large an angle, a microlens fails to perform its own light-condensation capability, offering a problem that the brightness of an image changes extremely between the central and the peripheral portion of the image. Thus, the angle of incidence of light rays on image pickup devices such as CCDs, that is, the position of an exit pupil is important in view of design. In other words, it is necessary to position an aperture stop at the front of a lens arrangement, so that the exit pupil position can be shifted as near to the object side of the lens arrangement as possible.

Some known imaging optical systems consisting of two aspheric lenses and using a plastic lens are disclosed in Patent Publications 1, 2, 3 and 4.

Several known imaging optical systems consisting of two aspheric lenses with an aperture stop located at the front of a lens arrangement are set forth in Patent Publications 5, 6, 7 and 8.

Patent Publications 9 and 10 show an imaging optical system consisting of two lenses with a first lens having weak refracting power. Patent Publication 11 proposes an imaging optical system of four-lens construction wherein some lenses are provided in the form of infrared cut filters.

Patent Publication 1
JP-A 2002-296496
Patent Publication 2
U.S. Pat. No. 3,393,186
Patent Publication 3
JP-A 2002-267928
Patent Publication 4
JP-A 2001-183578
Patent Publication 5
JP-A 8-334684
Patent Publication 6
JP-A 2003-75719
Patent Publication 7
U.S. Pat. No. 3,345,410
Patent Publication 8
U.S. Pat. No. 3,396,683
Patent Publication 9
JP-A 2002-296495
Patent Publication 10
JP-A 2000-35533
Patent Publication 11
JP-A 5-150172

However, these prior imaging optical systems are structurally difficult to achieve a sensible tradeoff between compactness and securing a back focus.

SUMMARY OF THE INVENTION

In consideration of such problems with the prior arts as mentioned above, one object of the present invention is to achieve a further extension of an imaging module made up of two lenses, thereby providing a small-format imaging optical system with which optical performance and a given back focus can be easily achievable, and an imaging system that incorporates the same.

Another object of the invention is to provide an optical system that has an F-number of about 2.8 and a large angle of view of as large as 60° or greater and so is suited for use on digital still cameras, digital video cameras, miniature cameras built in cellular phones and personal computers, surveillance cameras or the like.

A further object of the invention is to provide an optical system that is so reduced in its axial direction length that it is suited for use on a small-format imaging module.

According to the first aspect of the invention, the above objects are accomplished by provision of an imaging optical system, including an image-formation lens arrangement comprising two lenses, in order from an object side thereof, a first meniscus lens convex on an object side thereof and a second lens having positive refracting power and a convex surface configured such that the absolute value of the curvature of an object side-surface thereof is larger than the absolute value of the curvature of an image side-surface thereof, wherein said image-formation lens arrangement has only two lens elements in all, and further including an aperture stop located on the object side of said image-formation lens arrangement, with satisfaction of the following conditions:

$$-0.27 < f_2/f_1 < 0.27 \quad (1)$$

$$-0.5 < (r_2 - r_3)/(r_2 + r_3) < 0.2 \quad (2)$$

where:
$f_1$ is the focal length of the first meniscus lens,
$f_2$ is the focal length of the second lens,
$r_2$ is the axial radius of curvature of the image side-surface of the first meniscus lens, and
$r_3$ is the axial radius of curvature of the object side-surface of the second lens.

According to the second aspect of the invention, the imaging optical system of the above 1st aspect satisfies the following conditions:

$$-0.1 < f_2/f_1 < 0.1 \quad (1)'$$

$$-0.2 < (r_2 - r_3)/(r_2 + r_3) < 0.1 \quad (2)'$$

Advantages of the imaging optical systems constructed according to the 1st and 2nd aspects of the invention are now explained.

Referring to an electronic image pickup device used as the image pickup device, if the angle of incidence of an off-axis light beam emitted out of the optical system on an image plane is too large, it is then likely to yield a so-called shading phenomenon where the brightness of an image varies between the central and the peripheral portion of the image. To avoid this, the aperture stop is located nearest to the object side of the optical system thereby making the angle of incidence of light rays on the image pickup device small. Generally, it is preferable to determine the power profile of a lens arrangement in such a way as to shift an exit pupil position toward its object side. In the optical system of the invention comprising a limited number of lenses, however, it is most effective to position the aperture stop on the object side thereof.

In favor of reducing the length of the optical system, curved surfaces of positive power are applied to the object sides of both the first lens and the second lens to shift the principal point positions of the whole optical system toward the object side thereof.

The power of the first lens is more reduced than that of the second lens to such an extent as to satisfy condition (1); in other words, stronger positive refracting power is given to the second lens, thereby ensuring that the optical system can have a longer back focus. Whenever necessary, therefore, filters or cover glasses could be located in the ensured space.

Reducing the length of the optical system is contrary to increasing the back focus of the optical system. However, if the first and second lenses are configured such that their object side-surfaces have positive power and the powers of the first and second lenses are properly balanced in such a way as to satisfy condition (1), it is then possible to achieve length reductions and take the necessary back focus.

As the lower limit of −0.27 to condition (1) is not reached and the negative power of the first lens becomes strong, the back focus of the optical system may be increased, but this often incurs an increase in the length of the optical system. As the upper limit of 0.27 to condition (1) is exceeded, it is difficult to increase the back focus of the optical system and, hence, make sure of spaces for receiving filters or cover glasses.

To achieve length reductions and high performance at the same time, it is desired to satisfy condition (2). Condition (2) is provided to make the air spacing between the first lens and the second lens so short that high performance is achievable with length reductions.

As the upper limit of 0.2 to condition (2) is exceeded, the refracting power of the object side-surface of the second lens becomes too strong relative to the refracting power of the image side-surface of the first lens and, consequently, aberrations, especially field of curvature and distortion, produced at the object side-surface of the second lens become too large to achieve high performance even with an aspheric surface. Falling short of the lower limit of −0.5 to condition (2) may favor correction of off-axis aberrations because of a decrease in the refracting power of the object side-surface of the second lens; however, an air lens defined by the image side-surface of the first lens and the object side-surface of the second lens takes on a shape having strong negative refracting power. As a result, the gap between the image side-surface of the first lens and the object side-surface of the second lens becomes narrow toward their peripheries. Accordingly, to prevent the opposite surfaces of the first and second lenses from collision with each other at their peripheries, the air spacing between the first lens and the second lens has to be widened, often resulting in an increase in the length of the optical system. Especially when a flare stop is interposed between the first lens and the second lens, it is required to take an additional space for receiving that stop; the air spacing between the first lens and the second lens must be further widened, often resulting in an increase in the length of the optical system.

Regarding condition (1), it is desired that the upper limit thereto be set at 0.2, preferably 0.1, and more preferably 0.07, and the lower limit thereto be set at −0.2, preferably −0.1, and more preferably −0.07.

Regarding condition (2), it is desired that the upper limit thereto be set at 0.15, preferably 0.1, and more preferably 0.05, and the lower limit thereto be set at −0.3, preferably −0.2, and more preferably −0.1.

For instance, it is more desired that $$-0.1 < f_2/f_1 < 0.1 \tag{1}'$$

$$-0.2 < (r_2 - r_3)/(r_2 + r_3) < 0.1 \tag{2}'$$

According to the third aspect of the invention, in the imaging optical system of the above $1^{st}$ or $2^{nd}$ aspect, the first meniscus lens comprises at least one aspheric surface, and the second lens comprises an aspheric surface on at least an image side-surface thereof.

Advantages of the imaging optical system constructed according to the above $3^{rd}$ aspect are now explained.

To achieve high performance, each of the first and second lenses should preferably have an aspheric surface, so that spherical aberrations can be corrected primarily at the aspheric surface of the first lens and field of curvature and distortion can be corrected primarily at the aspheric surface of the second lens. It is here noted that especially when the aperture stop is located nearest to the object side of the optical system, off-axis aberrations such as field of curvature and distortion are hardly correctable because of the presence of the lenses on only one side of the stop. It is thus desired that both surfaces of the second lens be defined by aspheric surfaces to make satisfactory correction for such off-axis aberrations.

According to the fourth aspect of the invention, in the imaging optical system of the above $3^{rd}$ aspect, at least one of the first and second lenses is formed of a plastic lens.

Advantages of the imaging optical system constructed according to the above $4^{th}$ aspect are now explained.

For cost reductions and weight reductions, it is desired that the first lens having an aspheric surface and/or the second lens having an aspheric surface be formed of a plastic lens(es) made of optical resin.

According to the fifth aspect of the invention, in the imaging optical system of the above $3^{rd}$ aspect, said at least one aspheric surface used in the first meniscus lens includes an object side-convex surface area whose curvature becomes weak with distance from the optical axis of the imaging optical system, and the aspheric surface that defines the image side-surface of the second lens includes an image side-concave surface area whose curvature becomes strong with distance from the optical axis of the imaging optical system.

Advantages of the imaging optical system constructed according to the above $5^{th}$ aspect are now explained.

Such aspheric shapes favor correction of spherical aberrations at the aspheric surface of the first lens, and correction of remaining off-axis aberrations, say, field of curvature and distortion at the aspheric surface of the second lens.

According to the sixth aspect of the invention, in the imaging optical system of the above $5^{th}$, the object side-surface of the second lens is defined by an aspheric surface including an object side-convex surface area whose curvature becomes weak with distance from the optical axis of the imaging optical system.

Referring to advantages of the imaging optical system constructed according to the above 6$^{th}$ aspect, such an aspheric shape ensures better correction of off-axis aberrations.

According to the seventh aspect of the invention, the imaging optical system of any one of the above 1$^{st}$ to 6$^{th}$ aspects further satisfies the following condition:

$$0.3 < \Sigma d/f < 1.2 \quad (3)$$

where $\Sigma d$ is the distance from the aperture stop to the image side-surface of the second lens, and f is the focal length of the imaging optical system.

According to the eighth aspect of the invention, the imaging optical system of the above 7$^{th}$ aspect satisfies the following condition:

$$0.5 < \Sigma d/f < 0.9 \quad (3)'$$

Advantages of the imaging optical systems constructed according to the above 7$^{th}$ and 8$^{th}$ aspects are now explained.

By satisfaction of condition (3), it is easy to achieve an optical system having a wide angle of view and a reduced length. As the upper limit of 1.2 to this condition is exceeded, the lens arrangement may become long, and as the lower limit of 0.3 is not reached, the focal length of the lens arrangement may increase with a narrowing angle of view.

Regarding condition (3), it is desired that the upper limit thereto be set at 1.0, preferably 0.9, and more preferably 0.85, and the lower limit thereto be set at 0.4, preferably 0.5, and more preferably 0.6.

For instance, it is more preferable that $$0.5 < \Sigma d/f < 0.9 \quad (3)'$$

According to the ninth aspect of the invention, the imaging optical system of any one of the above 1$^{st}$ to 8$^{th}$ aspects further satisfies the following condition:

$$0.2 < Bf/f < 1.0 \quad (4)$$

where Bf is the length, as calculated on an air basis, from the image side-surface of the second lens to the image plane position of the imaging optical system, provided that an object point distance is taken as infinite, and f is the focal length of the imaging optical system.

According to the tenth aspect of the invention, the imaging optical system of the above 9$^{th}$ aspect satisfies the following condition:

$$0.3 < Bf/f < 0.8 \quad (4)'$$

Advantages of the imaging optical systems constructed according to the above 9$^{th}$ and 10$^{th}$ aspects are now explained.

Condition (4) is provided to accomplish high performance with an increased back focus. Exceeding the upper limit of 1.0 to this condition may be helpful for receiving filters because the back focus becomes long. To obtain an extension of back focus, however, the image side-surface of the second lens must have strong negative power, rendering correction of aberrations of off-axis light rays difficult and often resulting in an increase in the length of the imaging optical system. As the lower limit of 0.2 is not reached, on the other hand, the back focus becomes too short to receive a filter or cover glass.

Regarding condition (4), it is desired that the upper limit thereto be set at 0.8, preferably 0.7, and more preferably 0.65, and the lower limit thereto be set at 0.3, preferably 0.4, and more preferably 0.5.

For instance, it is more preferable that $$0.3 < Bf/f < 0.8 \quad (4)'$$

According to the 11$^{th}$ aspect of the invention, the imaging optical system of any one of the above 1$^{st}$ to 10$^{th}$ aspects further satisfies the following conditions:

$$-0.2 < (r_1 - r_2)/(r_1 + r_2) < 0.5 \quad (5)$$

$$-4.0 < (r_3 - r_4)/(r_3 + r_4) < -0.4 \quad (6)$$

where:

$r_1$ is the axial radius of curvature of the object side-surface of the first meniscus lens, $r_2$ is the axial radius of curvature of the image side-surface of the first meniscus lens, $r_3$ is the axial radius of curvature of the object side-surface of the second lens, and $r_4$ is the axial radius of curvature of the image side-surface of the second lens.

According to the 21$^{th}$ aspect of the invention, the imaging optical system of the above 11$^{th}$ aspect satisfies the following conditions:

$$0 < (r_1 - r_2)/(r_1 + r_2) < 0.2 \quad (5)'$$

$$-1.1 < (r_3 - r_4)/(r_3 + r_4) < -0.8 \quad (6)'$$

Advantages of the imaging optical systems according constructed to the above 11$^{th}$ and 12$^{th}$ aspects are now explained.

Conditions (5) and (6) are concerned with the configurations of the first and second lenses, respectively, and provided for well balancing the performance and length reductions against the back focus of the optical system.

As the upper limit of 0.5 to condition (5) is exceeded, the negative refracting power of the image side-surface of the first lens becomes strong relative to the positive refracting power of the object side-surface of the first lens, rendering correction of spherical aberrations occurring at that image side-surface difficult and high performance hardly achievable, or else the medium thickness of the first lens must be increased for correction of spherical aberrations thereby entering a narrow light beam in the image side-surface of the first lens, often leading to an increase in the length of the imaging optical system.

As the lower limit of −0.2 to condition (5) is not reached, the positive refracting power of the object side-surface of the first lens becomes strong relative to the refracting power of the image side-surface of the first lens, rendering correction of spherical aberrations difficult and movement of the principal point positions toward the object side of the optical system too large to increase the back focus of the optical system.

As the upper limit of −0.4 to condition (6) is exceeded, the negative refracting power of the image side-surface of the second lens becomes strong relative to the positive refracting power of the object side-surface of the second lens, rendering correction of field of curvature and distortion occurring at that image side-surface difficult even with an aspheric surface.

As the lower limit of −4.0 to condition (6) is not reached, the image side-surface of the second lens can have positive power strong enough to cause the principal point positions to come near to the image plane side of the optical system, often leading to an increase in the length of the optical system.

Regarding condition (5), it is desired that the upper limit thereto be set at 0.3, preferably 0.2, and more preferably 0.15, and the lower limit thereto be at −0.1, preferably 0, and more preferably 0.05.

Regarding condition (6), it is desired that the upper limit thereto be set at −0.6, preferably −0.8, and more preferably −0.85, and the lower limit thereto be set at −3.0, preferably −2.0, and more preferably −1.1.

For instance, it is more preferable that $$0<(r_1-r_2)/(r_1+r_2)<0.2 \quad (5)'$$

$$-1.1<(r_3-r_4)/(r_3+r_4)<-0.8 \quad (6)'$$

According to the 13th aspect of the invention, the imaging optical system of any one of the above 1st to 12th aspects further satisfies the following condition:

$$-2.0<EXP/f<-0.7 \quad (7)$$

where EXP is a paraxial exit pupil position on the basis of an image-formation position where an object point distance is taken as infinite, and f is the focal length of the imaging optical system.

According to the 14th aspect of the invention, the imaging optical system of the above 13th aspect satisfies the following condition (7)':

$$-1.5<EXP/f<-1.0 \quad (7)'$$

Advantages of the imaging optical systems constructed according to the above 13th and 14th aspects are now explained.

In the present invention, the aperture stop is located nearest to the object side of the optical system for prevention of shading. If condition (7) is satisfied, however, it is then easy to reduce shading even when the optical system is short.

As the upper limit of −0.7 to this condition is exceeded, the optical system may become long. As the lower limit of −2.0 is not reached, there is too large an angle of incidence of light rays on the image pickup plane of a CCD or other electronic image pickup device located in the vicinity of the image plane of the optical system, resulting in the likelihood of a drop of the brightness of the peripheral area of an image.

Regarding condition (7), it is desired that the upper limit thereto be set at −0.9, preferably −1.0, and more preferably −1.1, and the lower limit thereto be set at −1.7, preferably −1.5, and more preferably −1.3.

For instance, it is more preferable that $$-1.5<EXP/f<-1.0 \quad (7)'$$

According to the 15th aspect of the invention, there is provided an imaging optical system comprising an image-formation lens arrangement comprising two lenses, in order from an object side thereof, a first meniscus lens convex on an object side thereof and a second lens having positive refracting power and a convex surface configured such that the absolute value of the curvature of an object side-surface thereof is larger than the absolute value of the curvature of an image side-surface thereof, wherein said image-formation lens arrangement has only two lens elements in all, and further including an aperture stop located on the object side of said image-formation lens arrangement, wherein the first meniscus lens is formed of an optical resin having such a property as to absorb wavelengths in a near infrared range.

Advantages of the imaging optical system constructed according to the 15th aspect of the invention are now explained.

Generally, an infrared cut filter is interposed between a final lens and an image plane position. Among infrared cut filters known so far in the art, there are a plane-parallel plate having a property of absorbing wavelengths in the near infrared range as well as an image pickup device's cover glass, a low-pass filter, etc., which are provided on their surfaces with infrared cut coatings.

However, an infrared cut coating varies in color tones from the center to the periphery when not used with an optical system having fairly good telecentricity, because its wavelength characteristics vary largely with the angle of incidence of incoming light rays.

As an infrared cut filter of the type that absorbs a wavelength band in the near infrared range is interposed between a final lens and an image plane position, there is only a little space available for receiving a low-pass filter or an image pickup device's cover glass, and there is little or no space for moving a lens arrangement upon focusing, etc.

Therefore, if a lens-forming vitreous material is made of an optical resin having such properties as to absorb wavelengths in the near infrared range, any back focus longer than needed can then be dispensed with, leading to a reduction in the length of the optical system.

Constructing a lens of an infrared cut filter is already known from Patent Publication 11, etc. As also described in this Patent Publication 11, it is preferable to use an infrared cut filter with a lens such as one in which an axial chief ray path is substantially equal to an off-axis chief ray path.

In the optical system of the invention, it is preferable to use an infrared cut filter with the first lens. The first lens, because of having weak power, has a uniform thickness from the center as far as the periphery thereof. Since the aperture stop is located in the vicinity of the first lens, the off-axis chief ray, too, passes through the vicinity of the center of the lens. In the first lens in which the axial chief ray path is substantially equal to the off-axis chief ray path, therefore, color variations on a screen can be held back.

According to the 16th aspect of the invention, the imaging optical system of the above 15th aspect further satisfies the following conditions:

$$-0.27<f_2/f_1<0.27 \quad (1)$$

$$-0.2<(r_1-r_2)/(r_1+r_2)<0.5 \quad (5)$$

where:
$f_1$ is the focal length of the first meniscus lens,
$f_2$ is the focal length of the second lens,
$r_1$ is the axial radius of curvature of the object side-surface of the first meniscus lens, and
$r_2$ is the axial radius of curvature of the image side-surface of the first meniscus lens.

Referring to advantages of the imaging optical system constructed according to the 16th aspect of the invention, the object side- and image side-surfaces of the first lens can have an approximate shape by satisfying conditions (1) and (5). Accordingly, if the first lens is formed of an optical resin having such properties as to absorb wavelengths in the near infrared range, it is then possible to prevent colors from varying on the screen due to the infrared cut filter.

According to the 17th aspect of the invention, in the imaging optical system of the above 16th aspect, the object side- and image side-surfaces of the first lens are each defined by an aspheric surface convex toward the object side of the imaging optical system, whose curvature becomes weak with distance from the optical axis of the imaging optical system.

Referring to advantages of the imaging optical system constructed according to the 17$^{th}$ aspect of the invention, the use of such aspheric surfaces favors correction of spherical aberrations. In addition, the aspheric surfaces of the first lens have a similar shape, so that variations in the action of the infrared cut filter can be held back.

According to the 18$^{th}$ aspect of the invention, there is provided an imaging system comprising an imaging optical system as recited in any one of the 1$^{st}$ to 17$^{th}$ aspect of the invention and an electronic image pickup device located on an image side thereof.

Referring to advantages of the imaging system constructed according to the 18$^{th}$ aspect of the invention, a compact design with a suitable back focus is achievable by using the imaging optical system of the invention in combination with an electronic image pickup device.

According to the 19$^{th}$ aspect of the invention, in the imaging system of the above 18$^{th}$ aspect, a low-pass filter is interposed between the imaging optical system and the electronic image pickup device.

Referring to advantages of the imaging system constructed according to the 19$^{th}$ aspect of the invention, a design with a suitable back focus is so easily achievable that even with a low-pass filter located therein, significant compactness can be accomplished.

According to the 20$^{th}$ aspect of the invention, in the imaging system of the above 18$^{th}$ aspect, a light ray that passes through the imaging optical system arriving at the imaging plane of the electronic image pickup device has a maximum angle of view of at least 60°.

Advantages of the imaging system constructed according to the 20$^{th}$ aspect of the invention are now briefly explained. The imaging optical system of the invention, because of being favorable for a wide-angle arrangement, is preferably used with such an imaging system. More preferably, the maximum angle of view (2ω) is at least 63°.

If the aspects of the present invention are applied in combination of two or more, much more favorable advantages could then be achieved. Commonly throughout the conditions provided therein, the upper and lower limits to each broader condition could be set at only the upper and/or lower limits of the corresponding narrower condition.

If the conditions provided herein are applied in combination of two or more, the advantages of the invention could then be much more enhanced.

Thus, the present invention can provide an imaging optical system of a small-format design capable of easily securing optical performance with a back focus, and an imaging system that incorporates the same.

Further, the present invention can provide an imaging optical system that has an F-number of about 2.8 and an angle of view of as large as 60° or greater, and so lends itself well to imaging modules for digital still cameras, digital video cameras, miniature cameras mounted on cellular phones and personal computers, surveillance cameras, etc.

Still other objects and advantages of the invention will in part be obvious and will in part be apparent from the specification.

The invention accordingly comprises the features of construction, combinations of elements, and arrangement of parts, which will be exemplified in the construction hereinafter set forth, and the scope of the invention will be indicated in the claims.

DESCRIPTION OF THE PREFERRED EMBODIMENTS

Examples 1–4 of the inventive imaging optical system are given below. FIGS. 1, 3, 5 and 7 are illustrative in lens arrangement section of Examples 1, 2, 3 and 4, respectively, upon focused on an object point at infinity. In these drawings, an aperture stop is indicated by S, a first lens by L1, a second lens by L2, a plane-parallel plate for an electronic image pickup device's cover glass or the like by CG, and an image plane by I. It is noted that the plane-parallel plate CG could be provided on its surface with a wavelength band limiting multilayer film or, alternatively, it could be designed to have a low-pass filter function.

EXAMPLE 1

Figure 1:
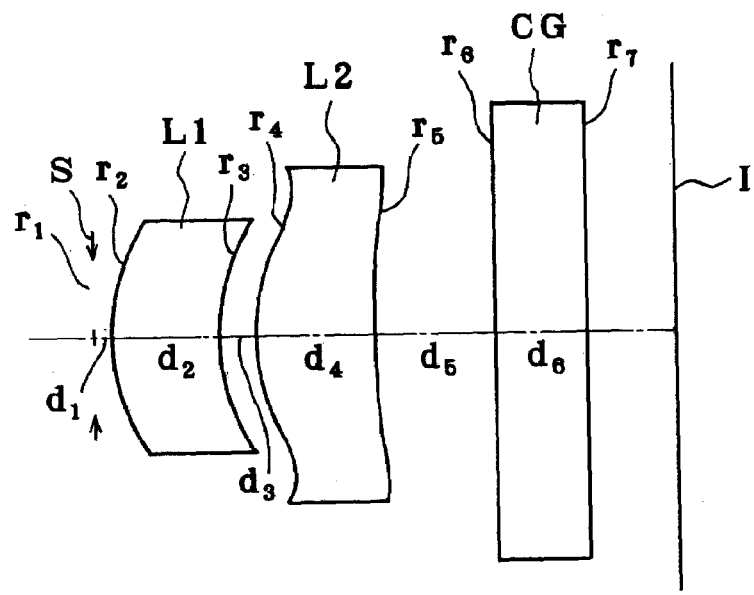
FIG. 1 is illustrative in lens arrangement section of Example 1 of the imaging optical system according to the invention upon focused on an infinite object point.

As shown in FIG. 1, this example is directed to an imaging optical system comprising, in order from its object side, an aperture stop S, a negative first lens L1 that is convex on its object side and has both its surfaces defined by aspheric surfaces and weak power, a second lens L2 that is convex on its object side and has both its surfaces defined by aspheric surfaces and positive power, and a cover glass CG.

The specifications for the wide angle-of-view optical system according to Example 1 are:

focal length f=2.43 mm,

F-number $F_{NO.}$=2.76, and total angle of view 2ω=64.2°.

EXAMPLE 2

Figure 2:
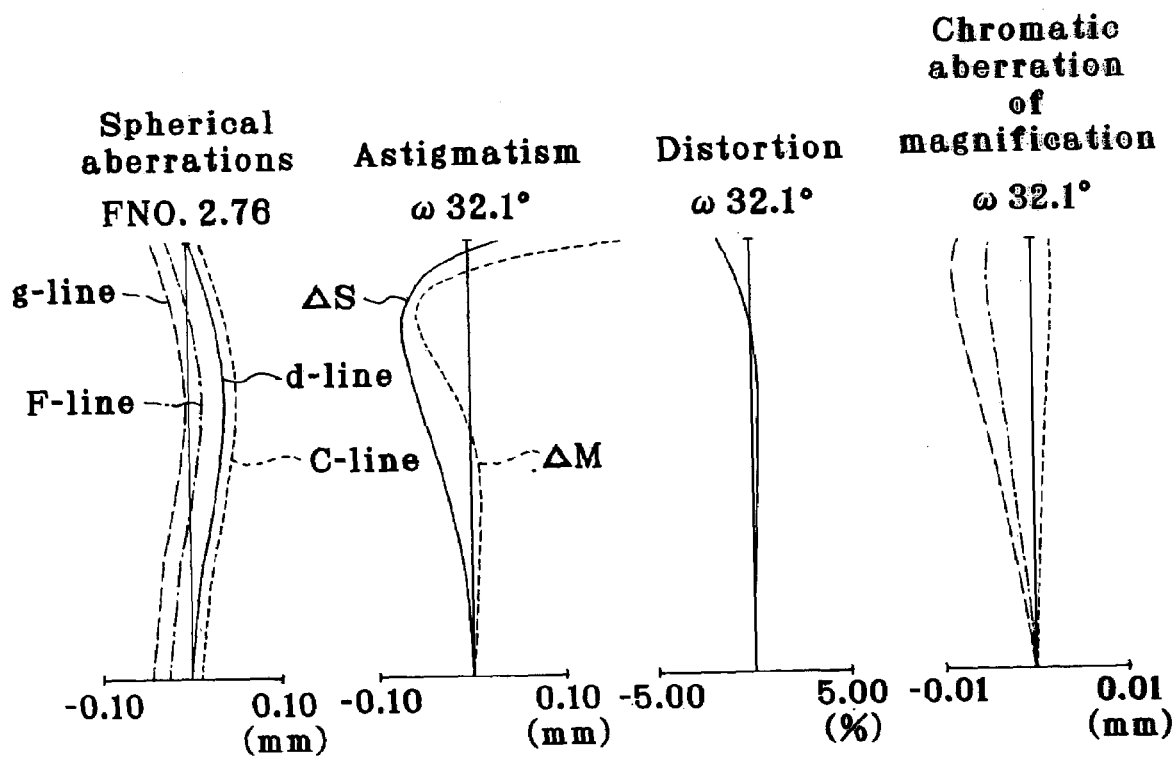
FIG. 2 is an aberration diagram for Example 1 upon focused on an infinite object point.

As shown in FIG. 2, this example is directed to an imaging optical system comprising, in order from its object side, an aperture stop S, a negative, ¥ first lens L1 that is convex on its object side and has both its surfaces defined by aspheric surfaces and weak power, a second lens L2 that is convex on its object side and has both its surfaces defined by aspheric surfaces and positive power, and a cover glass CG.

The specifications for the wide angle-of-view optical system according to Example 2 are:

focal length f=2.11 mm,

F-number $F_{NO.}$=2.78, and total angle of view 2ω=64°.

EXAMPLE 3

Figure 3:
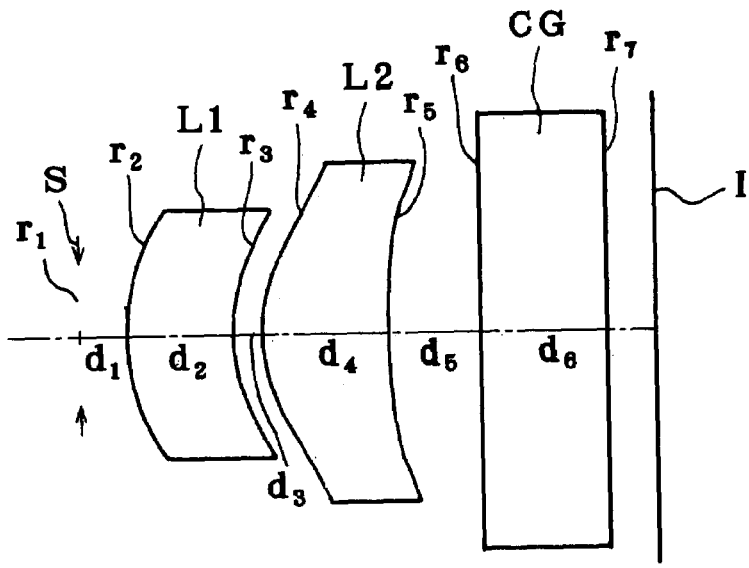
FIG. 3 is a sectional lens arrangement view, similar to FIG. 1, of Example 2 of the imaging optical system.

As shown in FIG. 3, this example is directed to an imaging optical system comprising, in order from its object side, an aperture stop S, a positive first lens L1 that is convex on its object side and has both its surfaces defined by aspheric surfaces and weak power, a second lens L2 that is convex on its object side and has both its surfaces defined by aspheric surfaces and positive power, and a cover glass CG.

The specifications for the wide angle-of-view optical system according to Example 3 are:

focal length f=2.43 mm,

F-number $F_{NO.}$=2.77, and total angle of view 2ω=64.2°.

EXAMPLE 4

Figure 4:
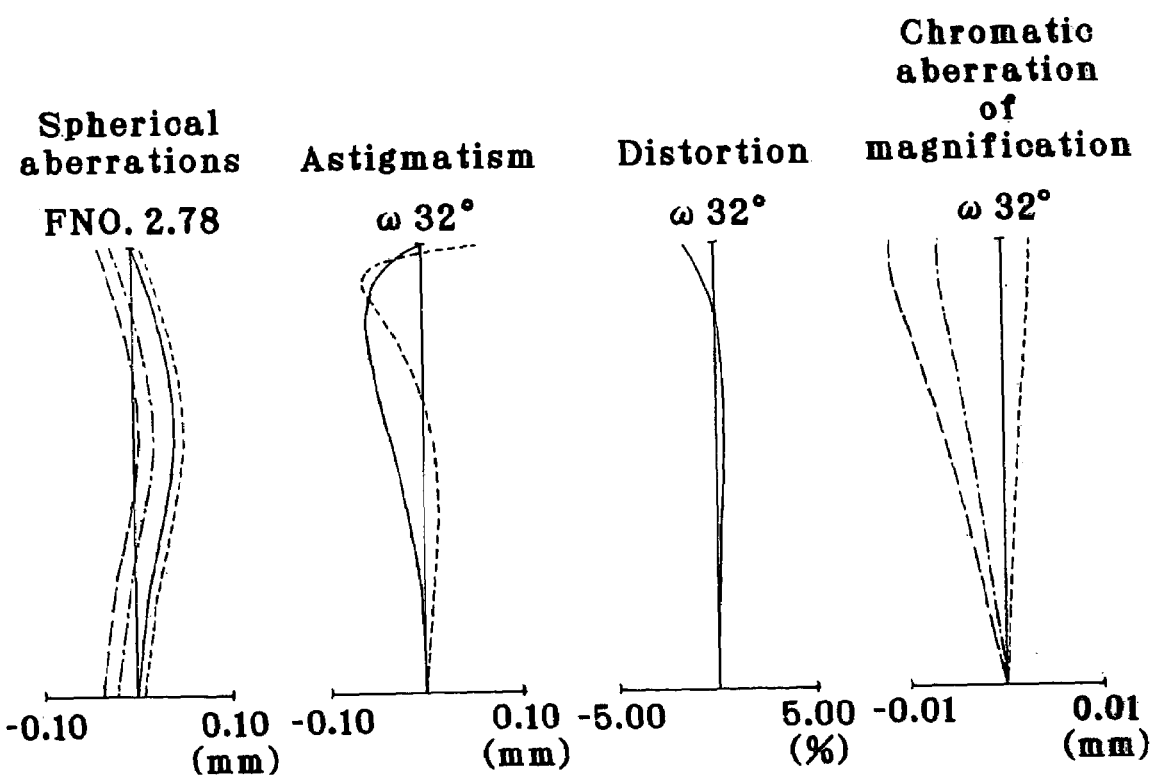
FIG. 4 is an aberration diagram for Example 2 upon focused on an infinite object point.
Figure 5:
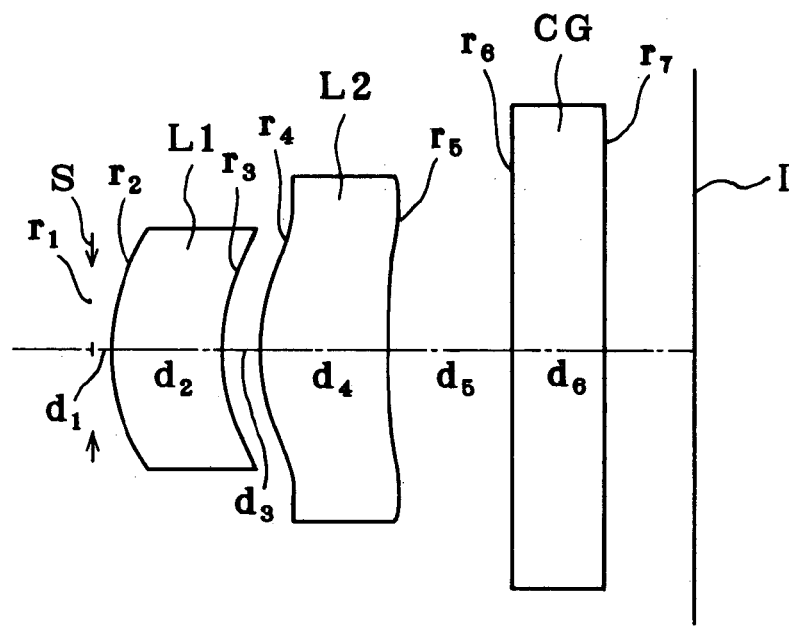
FIG. 5 is a sectional lens arrangement view, similar to FIG. 1, of Example 3 of the imaging optical system.
Figure 6:
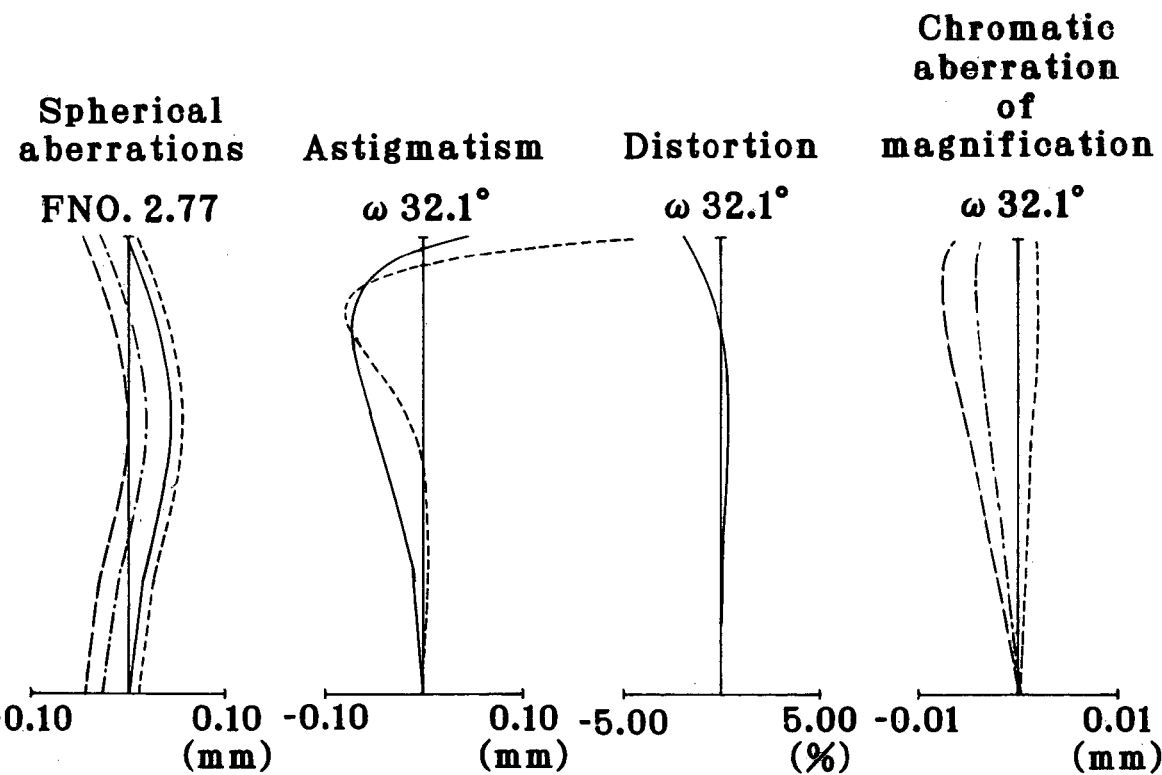
FIG. 6 is an aberration diagram for Example 3 upon focused on an infinite object point.
Figure 7:
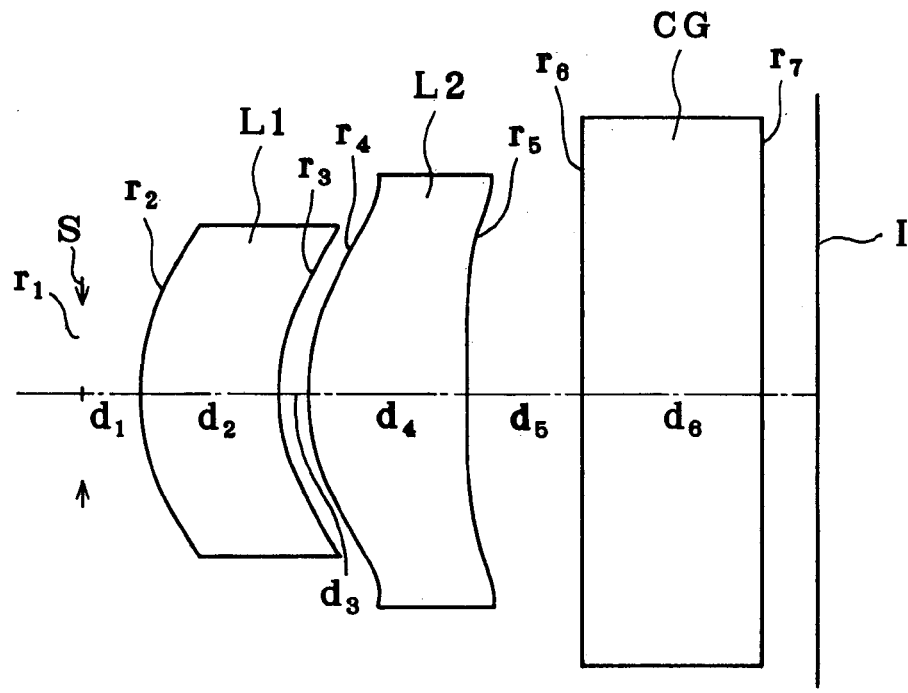
FIG. 7 is a sectional lens arrangement view, similar to FIG. 1, of Example 4 of the imaging optical system.
Figure 8:
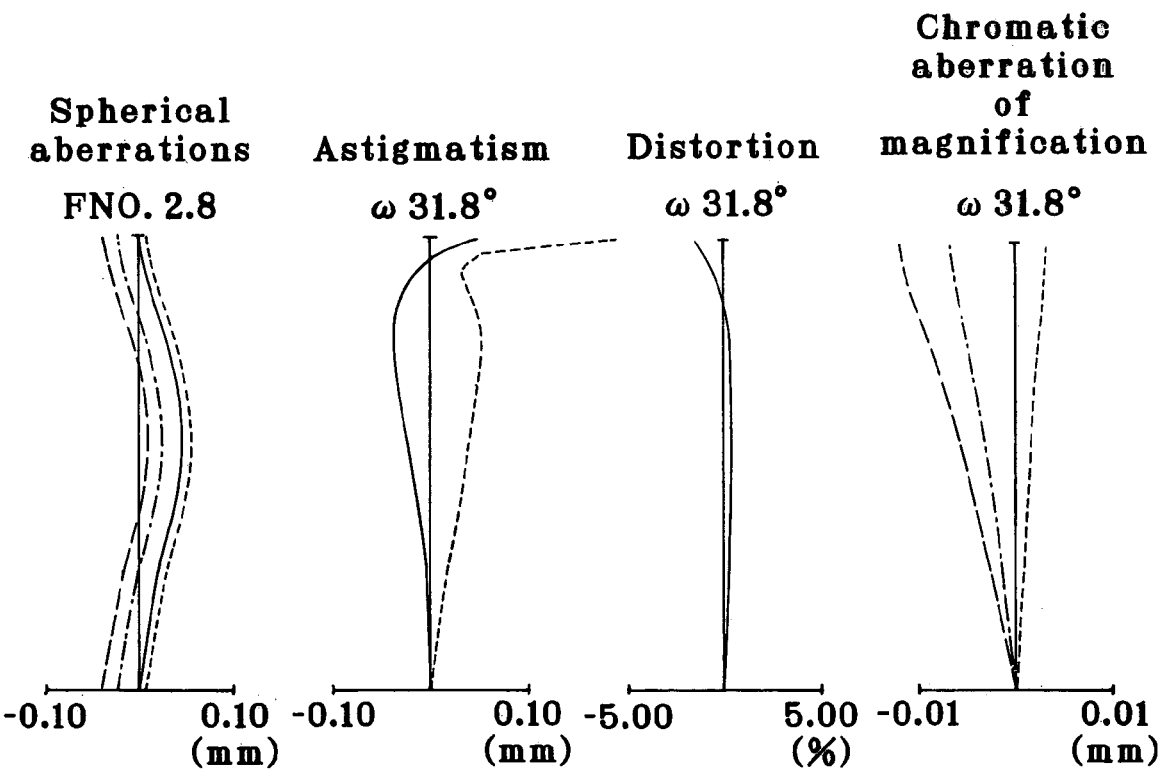
FIG. 8 is an aberration diagram for Example 4 upon focused on an infinite object point.

As shown in FIG. 4, this example is directed to an imaging optical system comprising, in order from its object side, an aperture stop S, a negative first lens L1 that is convex on its object side and has both its surfaces defined by aspheric surfaces and weak power, a second lens L2 that is convex on its object side and has both its surfaces defined by aspheric surfaces and positive power, and a cover glass CG.

The specifications for the wide angle-of-view optical system according to Example 4 are:

focal length f=2.13 mm,

F-number $F_{NO.}$=2.8, and total angle of view 2ω=63.6°.

Numerical data on each example will be enumerated later. It is noted that the symbols used hereinafter but not hereinbefore mean:

$r_1, r_2, \ldots$ : radius of curvature of each lens, $d_1, d_2, \ldots$ : spacing between adjacent lens, $n_{d1}, n_{d2}, \ldots$ : d-line refractive index of each lens, and $v_{d1}, v_{d2}, \ldots$ : Abbe constant of each lens.

Here let x represent an optical axis with the proviso that the direction of propagation of light is taken as positive, and y represent a direction orthogonal with respect to the optical axis. Then, aspheric configuration is given by $$x=(y^2/r)/[1+\{1-(K+1)(y/r)^2\}^{1/2}]+A_4y^4+A_6y^6+A_8y^8+A_{10}y^{10}$$

where r is an axial radius of curvature, K is a conical coefficient, and $A^4$, $A^6$, $A^8$ and $A^{10}$ are the $4^{th}$, $6^{th}$, $8^{th}$ and $10^{th}$ aspheric coefficients.

EXAMPLE 1

| | | | |
|---|---|---|---|
| $r_1 = \infty$(Stop) | $d_1 = 0.10$ | | |
| $r_2 = 1.116$ (Aspheric) | $d_2 = 0.60$ | $n_{d1} = 1.52542$ | $v_{d1} = 55.78$ |
| $r_3 = 0.908$ (Aspheric) | $d_3 = 0.20$ | | |
| $r_4 = 1.022$ (Aspheric) | $d_4 = 0.70$ | $n_{d2} = 1.52542$ | $v_{d2} = 55.78$ |
| $r_5 = 45.672$ (Aspheric) | $d_5 = 0.68$ | | |
| $r_6 = \infty$ | $d_6 = 0.50$ | $n_{d3} = 1.51633$ | $v_{d3} = 64.14$ |
| $r_7 = \infty$ | | | |

Aspherical Coefficients

2nd surface

K = −5.645
$A_4 = 2.39209 \times 10^{-1}$
$A_6 = 4.34015 \times 10^{-3}$
$A_8 = 0$
$A_{10} = 0$ 3rd surface K = 0.000
$A_4 = -7.25808 \times 10^{-1}$
$A_6 = 6.36347 \times 10^{-1}$
$A_8 = -3.61435 \times 10^{-1}$
$A_{10} = 0$ 4th surface K = −1.025
$A_4 = -2.23978 \times 10^{-1}$
$A_6 = 1.58321 \times 10^{-1}$
$A_8 = -2.62428 \times 10^{-1}$
$A_{10} = 0$ 5th surface K = 0.000
$A_4 = 2.16324 \times 10^{-1}$
$A_6 = -4.47286 \times 10^{-2}$
$A_8 = -2.51937 \times 10^{-1}$
$A_{10} = 1.16550 \times 10^{-1}$

EXAMPLE 2

| | | | |
|---|---|---|---|
| $r_1 = \infty$(Stop) | $d_1 = 0.25$ | | |
| $r_2 = 1.080$ (Aspheric) | $d_2 = 0.60$ | $n_{d1} = 1.52542$ | $v_{d1} = 55.78$ |
| $r_3 = 0.872$ (Aspheric) | $d_3 = 0.16$ | | |
| $r_4 = 0.872$ (Aspheric) | $d_4 = 0.70$ | $n_{d2} = 1.52542$ | $v_{d2} = 55.78$ |
| $r_5 = 22.968$ (Aspheric) | $d_5 = 0.50$ | | |
| $r_6 = \infty$ | $d_6 = 0.70$ | $n_{d3} = 1.51633$ | $v_{d3} = 64.14$ |
| $r_7 = \infty$ | | | |

Aspherical Coefficients

2nd surface

K = −9.586
$A_4 = 5.52440 \times 10^{-1}$
$A_6 = -3.82047 \times 10^{-1}$
$A_8 = 0$
$A_{10} = 0$ 3rd surface K = 0.000
$A_4 = -8.93098 \times 10^{-1}$
$A_6 = 1.46738$
$A_8 = -1.41918$
$A_{10} = 0$ 4th surface K = −0.966
$A_4 = -3.08689 \times 10^{-1}$
$A_6 = 4.08271 \times 10^{-1}$ -continued $A_8 = -3.04827 \times 10^{-1}$
$A_{10} = 0$ 5th surface $K = 0.000$
$A_4 = 3.40201 \times 10^{-1}$
$A_6 = -1.23074 \times 10^{-1}$
$A_8 = -3.72971 \times 10^{-2}$
$A_{10} = -4.13645 \times 10^{-2}$

EXAMPLE 3

| | | | |
|---|---|---|---|
| $r_1 = \infty$(Stop) | $d_1 = 0.10$ | | |
| $r_2 = 1.087$ (Aspheric) | $d_2 = 0.60$ | $n_{d1} = 1.52542$ | $v_{d1} = 55.78$ |
| $r_3 = 0.912$ (Aspheric) | $d_3 = 0.20$ | | |
| $r_4 = 1.036$ (Aspheric) | $d_4 = 0.70$ | $n_{d2} = 1.52542$ | $v_{d2} = 55.78$ |
| $r_5 = 21.382$ (Aspheric) | $d_5 = 0.67$ | | |
| $r_6 = \infty$ | $d_6 = 0.50$ | $n_{d3} = 1.51633$ | $v_{d3} = 64.14$ |
| $r_7 = \infty$ | | | |

Aspherical Coefficients

2nd surface $K = -6.404$
$A_4 = 3.29745 \times 10^{-1}$
$A_6 = -1.06253 \times 10^{-1}$
$A_8 = 0$
$A_{10} = 0$ 3rd surface $K = 0.000$
$A_4 = -7.39770 \times 10^{-1}$
$A_6 = 7.00400 \times 10^{-1}$
$A_8 = -4.98143 \times 10^{-1}$
$A_{10} = 0$ 4th surface $K = -1.005$
$A_4 = -2.70757 \times 10^{-1}$
$A_6 = 2.27259 \times 10^{-1}$
$A_8 = -5.16775 \times 10^{-1}$
$A_{10} = 0$ 5th surface $K = 0.000$
$A_4 = 1.85974 \times 10^{-1}$
$A_6 = -2.37171 \times 10^{-3}$
$A_8 = -4.18373 \times 10^{-1}$
$A_{10} = 2.29612 \times 10^{-1}$

EXAMPLE 4

| | | | |
|---|---|---|---|
| $r_1 = \infty$(Stop) | $d_1 = 0.25$ | | |
| $r_2 = 1.054$ (Aspheric) | $d_2 = 0.60$ | $n_{d1} = 1.52542$ | $v_{d1} = 55.78$ |
| $r_3 = 0.790$ (Aspheric) | $d_3 = 0.12$ | | |
| $r_4 = 0.840$ (Aspheric) | $d_4 = 0.70$ | $n_{d2} = 1.52542$ | $v_{d2} = 55.78$ |
| $r_5 = 775.610$ (Aspheric) | $d_5 = 0.50$ | | |
| $r_6 = \infty$ | $d_6 = 0.80$ | $n_{d3} = 1.51633$ | $v_{d3} = 64.14$ |
| $r_7 = \infty$ | | | |

Aspherical Coefficients

2nd surface $K = -11.511$
$A_4 = 7.54971 \times 10^{-1}$

-continued $A_6 = -7.95057 \times 10^{-1}$
$A_8 = 0$
$A_{10} = 0$

3rd surface $K = -0.105$
$A_4 = -1.05944$
$A_6 = 2.16350$
$A_8 = -2.71586$
$A_{10} = 0$ 4th surface $K = -0.967$
$A_4 = -4.55844 \times 10^{-1}$
$A_6 = 7.32458 \times 10^{-1}$
$A_8 = -5.96144 \times 10^{-1}$
$A_{10} = 0$ 5th surface $K = 0.000$
$A_4 = 3.20342 \times 10^{-1}$
$A_6 = -2.22169 \times 10^{-1}$
$A_8 = 1.83316 \times 10^{-1}$
$A_{10} = -1.82727 \times 10^{-1}$ FIGS. 2, 4, 6 and 8 are aberration diagrams for Examples 1, 2, 3 and 4, respectively, upon focused at infinity, wherein "ω" stands for a half angle of view.

The values of conditions (1) to (7) in Examples 1–4 are tabulated below.

| Condition | Example 1 | Example 2 | Example 3 | Example 4 |
|---|---|---|---|---|
| (1) | −0.001 | −0.001 | 0.034 | −0.058 |
| (2) | −0.059 | 0.000 | −0.064 | −0.031 |
| (3) | 0.66 | 0.81 | 0.66 | 0.78 |
| (4) | 0.62 | 0.59 | 0.61 | 0.59 |
| (5) | 0.10 | 0.11 | 0.09 | 0.14 |
| (6) | −0.96 | −0.93 | −0.91 | −1.00 |
| (7) | −1.15 | −1.27 | −1.13 | −1.24 |

While the aspheric lenses in Examples 1–4 are all formed of plastics, it is understood that the plastic lenses could be replaced by glass lenses. For instance, much higher performance could be achieved by use of glass having a refractive index higher than that of the plastic material used in any of the above examples. Likewise, the use of special low-dispersion glass could be more effective at correction of chromatic aberrations. The use of a plastic material of low hygroscopicity is particularly preferable because degradation of performance due to environmental changes is substantially reduced (for instance, Zeonex made by Nippon Zeon Co., Ltd.).

With a view to cutting off unnecessary light such as ghosts and flares, it is acceptable to rely upon a flare stop in addition to the aperture stop S. In Examples 1–4, that flare stop could be located at any desired position between the aperture stop S and the first lens L1, the first lens L1 and the second lens L2, and the second lens L2 and the image plane I. Alternatively, the lens frame could be used to cut off flare light rays or another member may be used as the flare stop. Such flare stops could be obtained by direct printing, coating, seal bonding on the optical system, etc., and configured in any desired form such as circular, oval, rectangular, polygonal forms or forms surrounded with functional curves. The flare stop used could be designed to cut off not only harmful light beams but also light beams such as coma flare around the screen.

Each lens could have been provided with an antireflection coating for the purpose of reducing ghosts and flares. Multicoatings are preferred because of having the ability to reduce ghosts and flares effectively. Alternatively, infrared cut coatings may have been applied on lens surfaces, cover glass surfaces or the like.

Focus adjustment could be carried out by focusing. Focusing could be performed by moving the whole lenses or extending or retracting some lenses.

A drop, if any, of brightness of the peripheral area of an image could be reduced by the shifting of the CCD microlenses. For instance, the design of CCD microlenses could be changed in association with the angle of incidence of light rays at each image height, or decreases in the quantity of light at the peripheral area of the image could be corrected by image processing.

Throughout Examples 1–4, the first lens L1 is formed of any material capable of absorbing near infrared radiation, and the plane-parallel plate is thinned without use of an IR cut filter or coating. In the plane-parallel plate CG shown in FIGS. 1, 3, 5, and 7, a low-pass filter is integral with a CCD cover glass. For further compactness, it is not always necessary to use a focusing mechanism. To secure focusing precision in a frequently used object point distance range in this case, the receiving plane of the CCD could be located at an image-formation position having a finite object point distance (of, e.g., 2 m to 0.3 m).

The imaging system according to the invention constructed as described above may be applied to phototaking systems where object images formed through image-formation optical systems are received at image pickup devices such as CCDs, in particular, digital cameras or video cameras as well as PCs and telephone sets that are typical information processors, in particular, easy-to-carry cellular phones. Given below are some such embodiments.

Figure 9:
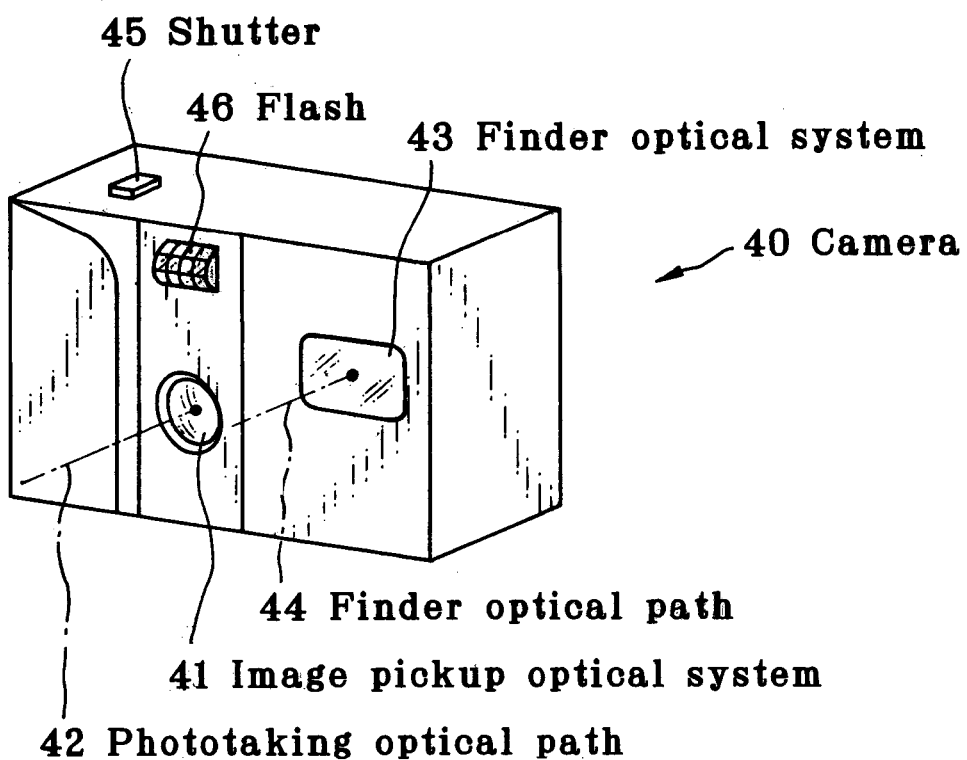
FIG. 9 is illustrative in front perspective of the external appearance of a digital camera having the imaging optical system built therein.
Figure 10:
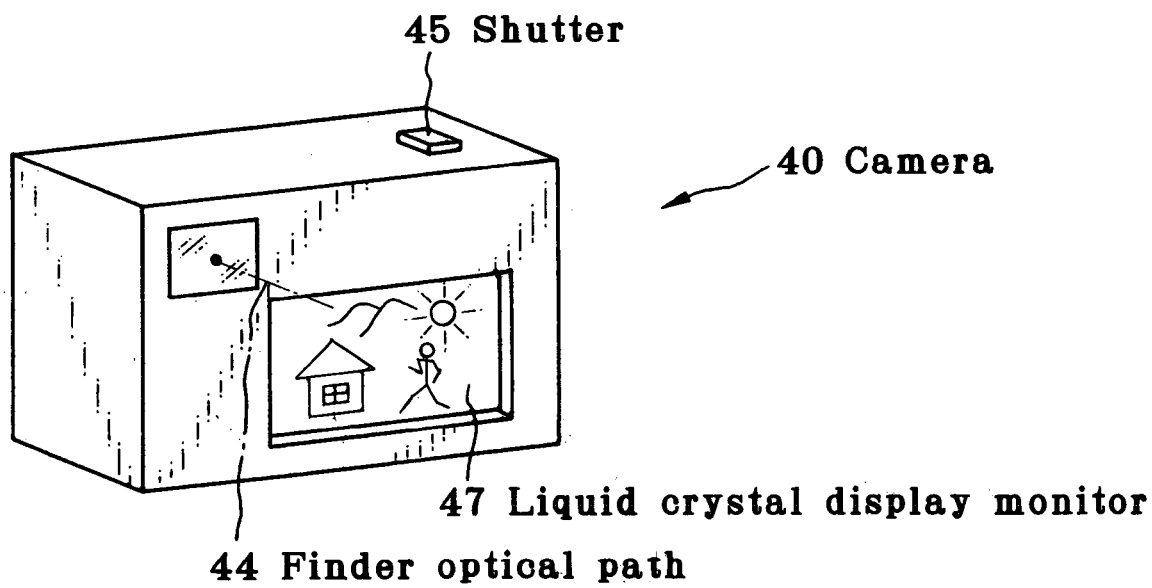
FIG. 10 is illustrative in rear perspective of the digital camera of FIG. 9.
Figure 11:
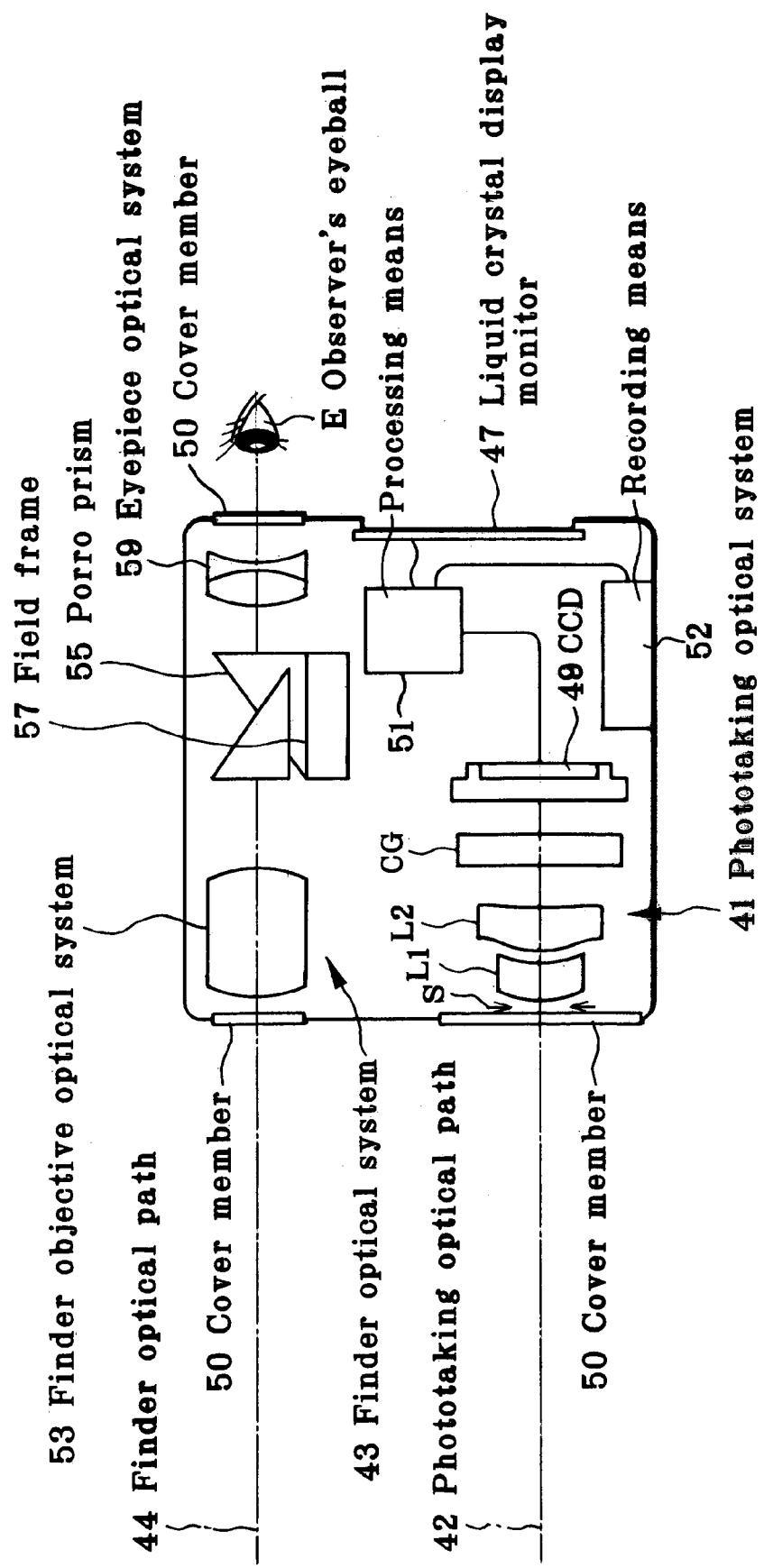
FIG. 11 is illustrative in section of the digital camera of FIG. 9.

FIGS. 9–11 are conceptual illustrations of a phototaking optical system 41 for digital cameras, in which the imaging optical system according to the invention is incorporated. FIG. 9 is a front perspective view of the external appearance of a digital camera 40, and FIG. 10 is a rear perspective view of the same. FIG. 11 is a sectional view of the construction of the digital camera 40. In this embodiment, the digital camera 40 comprises a phototaking optical system 41 including a phototaking optical path 42, a finder optical system 43 including a finder optical path 44, a shutter 45, a flash 46, a liquid crystal display monitor 47 and so on. As the shutter 45 mounted on the upper portion of the camera 40 is pressed down, phototaking takes place through the phototaking optical system 41, for instance, the imaging optical system according to Example 1. An object image formed by the phototaking optical system 41 is formed on the image pickup plane of a CCD 49 via a cover glass CG provided with a near-infrared cut coating and having a low-pass filter function. An object image received at CCD 49 is shown as an electronic image on the liquid crystal display monitor 47 via processing means 51, which monitor is mounted on the back of the camera. This processing means 51 is connected with recording means 52 in which the phototaken electronic image may be recorded. It is here noted that the recording means 52 may be provided separately from the processing means 51 or, alternatively, it may be constructed in such a way that images are electronically recorded and written thereon by means of floppy discs, memory cards, MOs or the like. This camera may also be constructed in the form of a silver-halide camera using a silver-halide film in place of CCD 49.

Moreover, a finder objective optical system 53 is located on the finder optical path 44. An object image formed by the finder objective optical system 53 is in turn formed on the field frame 57 of a Porro prism 55 that is an image-erecting member. In the rear of the Porro prism 55 there is located an eyepiece optical system 59 for guiding an erected image into the eyeball E of an observer. It is here noted that cover members 50 are provided on the entrance sides of the phototaking optical system 41 and finder objective optical system 53 as well as on the exit side of the eyepiece optical system 59.

With the thus constructed digital camera 40, it is possible to achieve high performance and compactness, because the phototaking optical system 41 is of high performance and compactness.

In the embodiment of FIG. 11, plane-parallel plates are used as the cover members 50; however, it is acceptable to use powered lenses.

Figure 12:
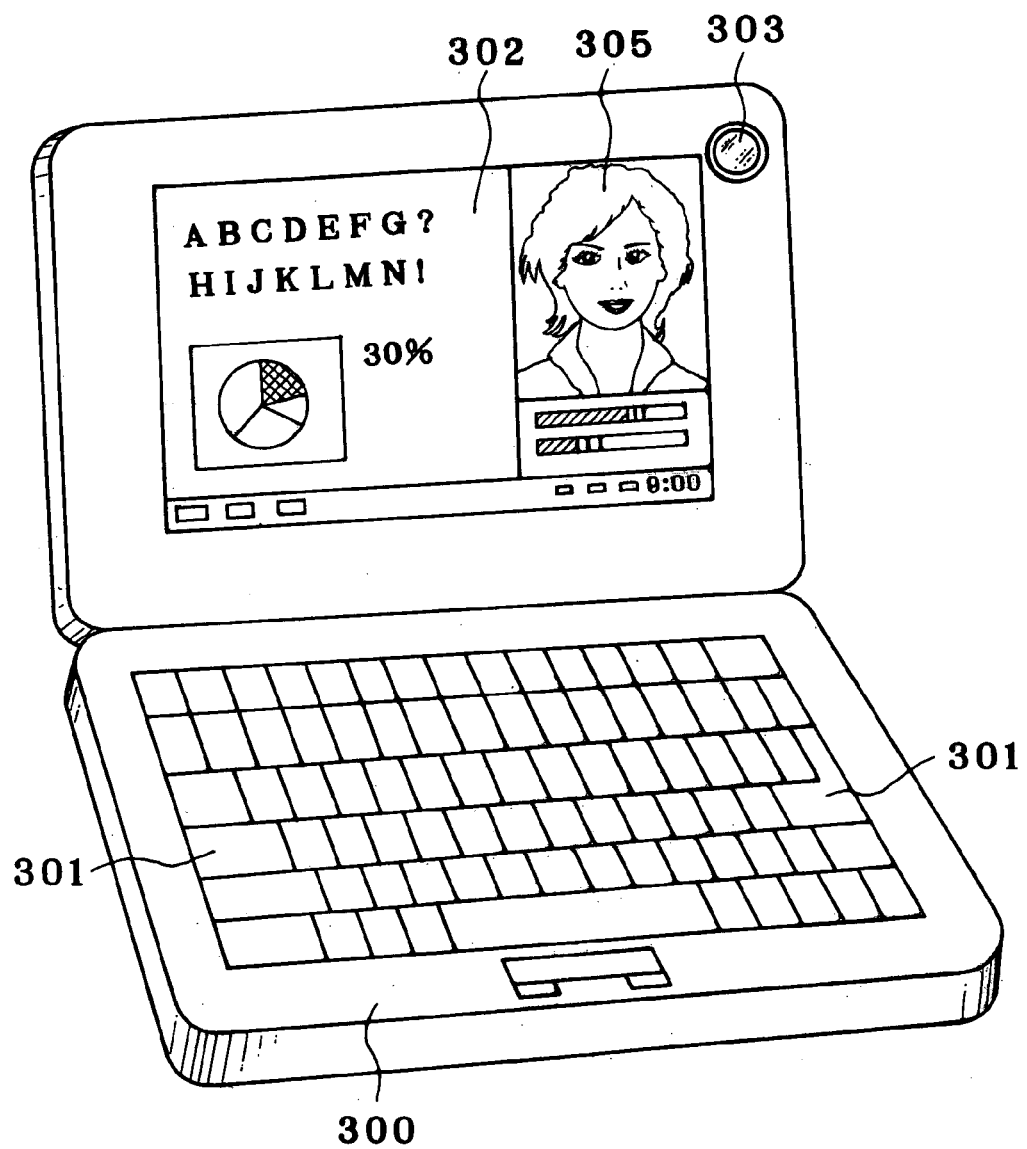
FIG. 12 is illustrative in front perspective of a personal computer having the imaging optical system of the invention built therein as an objective optical system, when it is in use.
Figure 13:
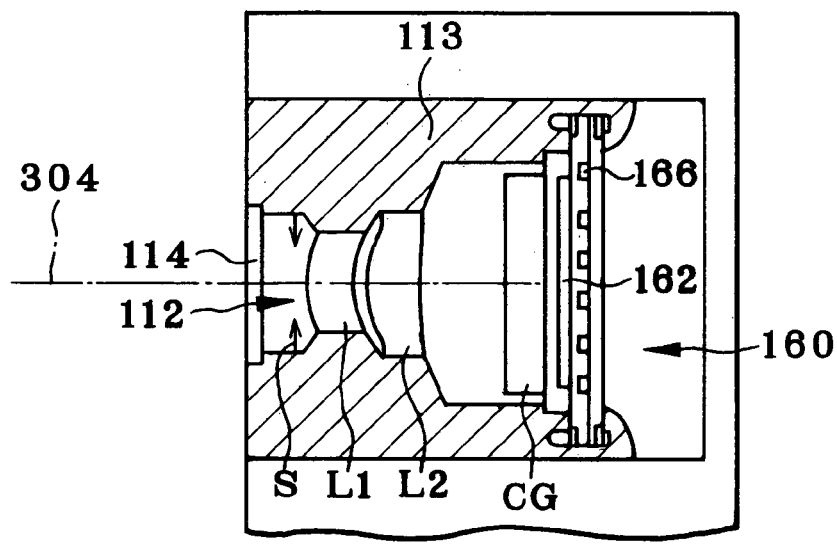
FIG. 13 is illustrative in section of a phototaking optical system used with the personal computer.
Figure 14:
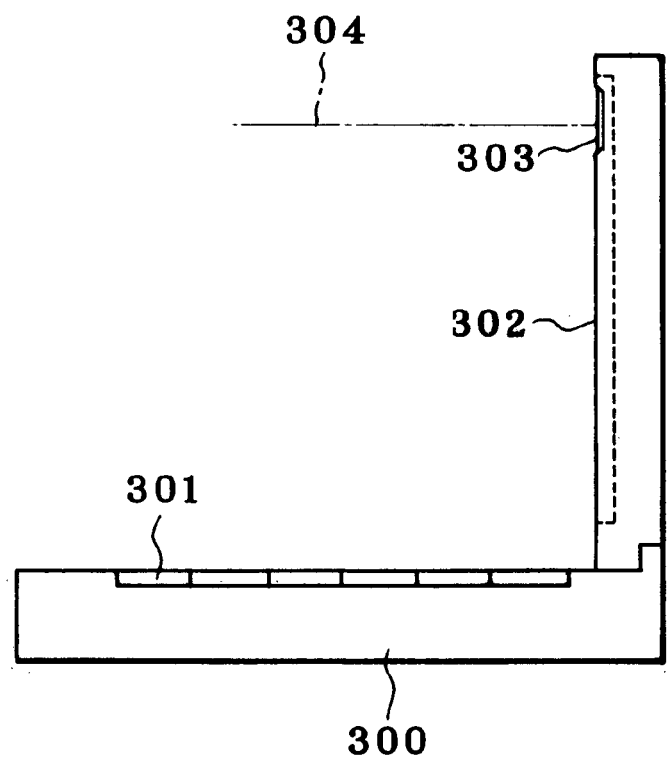
FIG. 14 is a side view of the state of FIG. 12.

FIGS. 12, 13 and 14 are illustrative of a personal computer that is one example of the information processor in which the imaging optical system according to the invention is built as an objective optical system. FIG. 12 is a front perspective view of a personal computer 300 in use, FIG. 13 is a sectional view of a phototaking optical system 303 in the personal computer 300, and FIG. 14 is a side view of the state of FIG. 12. As shown in FIGS. 12, 13 and 14, the personal computer 300 comprises a keyboard 301 via which an operator enters information therein from outside, information processing or recording means (not shown), a monitor 302 on which the information is shown for the operator, and a phototaking optical system 303 for taking an image of the operator and surrounding images. For the monitor 302, use may be made of a transmission type liquid crystal display device illuminated by backlight (not shown) from the back surface, a reflection type liquid crystal display device in which light from the front is reflected to show images, or a CRT display device. While the phototaking optical system 303 is shown as being built in the upper right portion of the monitor 302, it may be located somewhere around the monitor 302 or keyboard 301.

This phototaking optical system 303 comprises, on a phototaking optical path 304, an objective lens 112 comprising, for instance, the imaging optical system of Example 1 of the invention (roughly shown) and an image pickup device chip 162 for receiving an image. These are built in the personal computer 300.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in the processing means of the personal computer 300, and shown as an electronic image on the monitor 302. As an example, an image 305 taken of the operator is shown in FIG. 12. This image 305 may be shown on a personal computer on the other end via suitable processing means and the Internet or telephone line.

Figure 15A:
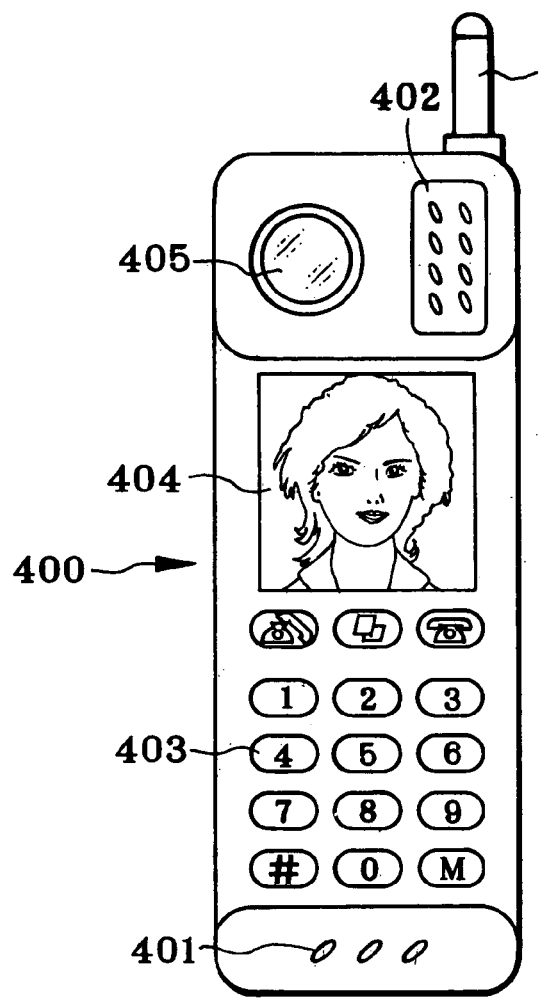
FIGS. 15($a$) and 15($b$) are a front view and a side view of a cellular phone having the imaging optical system of the invention built therein as an objective optical system, and FIG. 15($c$) is a sectional view of a photo-taking optical system therein.
Figure 15B:
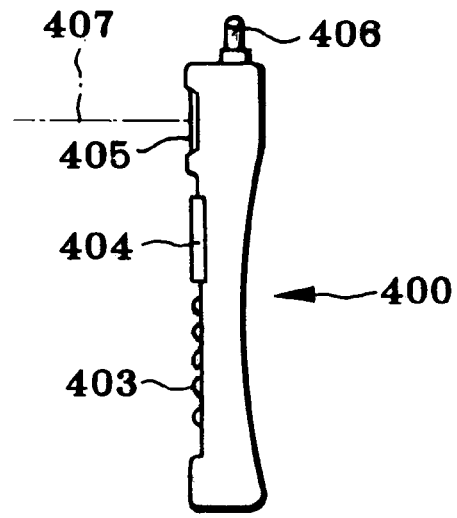
Figure 15C:
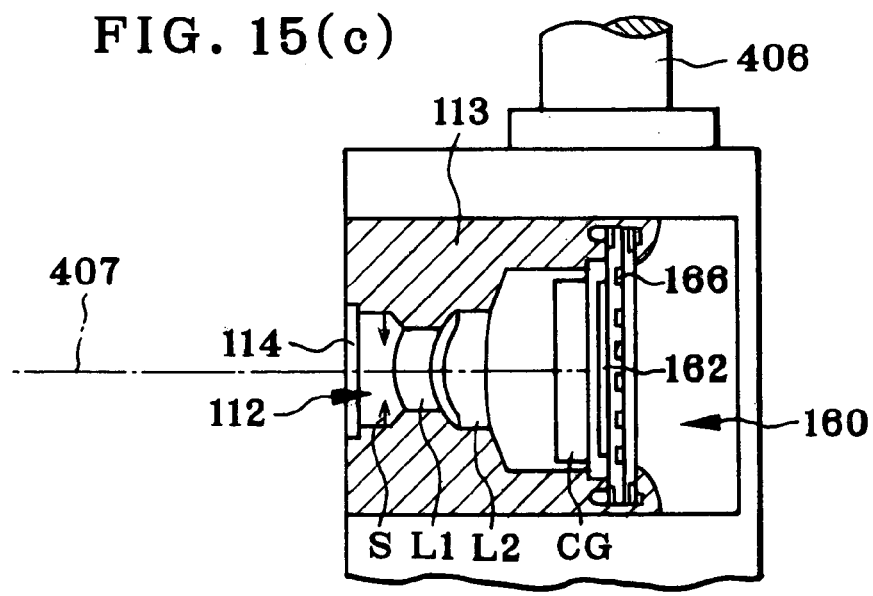

FIGS. 15(a), 15(b) and 15(c) are illustrative of a telephone set that is one example of the information processor in which the imaging optical system according to the invention is built, especially a convenient-to-carry cellular phone.

FIG. 15(a) and FIG. 15(b) are a front and a side view of a cellular phone 400, respectively, and FIG. 15(c) is a sectional view of a phototaking optical system 405. As shown in FIGS. 15(a), 15(b) and 15(c), the cellular phone 400 comprises a microphone 401 for entering the voice of an operator therein as information, a speaker 402 for producing the voice of the person on the other end, an input dial 403 via which the operator enters information therein, a monitor 404 for displaying an image taken of the operator or the person on the other end and indicating information such as telephone numbers, a phototaking optical system 405, an antenna 406 for transmitting and receiving communication waves, and processing means (not shown) for processing image information, communication information, input signals, etc. Here the monitor 404 is a liquid crystal display device. It is noted that the components are not necessarily arranged as shown. The phototaking optical system 405 comprises, on a phototaking optical path 407, an objective lens 112 comprising, for instance, the imaging optical system of Example 1 and an image pickup device chip 162 for receiving an object image. These are built in the cellular phone 400.

Here a cover glass CG having a low-pass filter function is additionally applied onto the image pickup device chip 162 to form an integral imaging unit 160, which can be fitted into the rear end of the lens barrel 113 of the objective lens 112 in one-touch operation. Thus, the assembly of the objective lens 112 and image pickup device chip 162 is facilitated because of no need of alignment or control of surface-to-surface spacing. The lens barrel 113 is provided at its end with a cover glass 114 for protection of the objective lens 112.

An object image received at the image pickup device chip 162 is entered via a terminal 166 in processing means (not shown), so that the object image can be displayed as an electronic image on the monitor 404 and/or a monitor on the other end. The processing means also include a signal processing function for converting information about the object image received at the image pickup device chip 162 into transmittable signals, thereby sending the image to the person on the other end.

Many modifications could be made to the examples and embodiments as described above according to what is recited in the claims.

I claim:

1. An imaging optical system, including an image-formation lens arrangement comprising two lenses, in order from an object side thereof, a first meniscus lens convex on an object side thereof and a second lens having positive refracting power and a convex surface on an object side thereof, the convex surface being configured such that an absolute value of a curvature of an object side-surface of said second lens is larger than an absolute value of a curvature of an image side-surface of said second lens, wherein said image-formation lens arrangement has only two lens elements in all, and further including an aperture stop located on the object side of said image-formation lens arrangement, with satisfaction of the following conditions:

$$-0.27 < f_2/f_1 < 0.27 \quad (1)$$

$$-0.5 < (r_2-r_3)/(r_2+r_3) < 0.2 \quad (2)$$

where:
$f_1$ is a focal length of the first meniscus lens,
$f_2$ is a focal length of the second lens,
$r_2$ is an axial radius of curvature of an image side-surface of the first meniscus lens, and
$r_3$ is an axial radius of curvature of the object side-surface of the second lens.

2. The imaging optical system according to claim 1, which satisfies the following conditions (1)' and (2)':

$$-0.1 < f_2/f_1 < 0.1 \quad (1)'$$

$$-0.2 < (r_2-r_3)/(r_2+r_3) < 0.1 \quad (2)'$$

3. The imaging optical system according to claim 1 or 2, wherein the first meniscus lens has at least one aspheric surface, and the second lens has an aspheric surface on the image side-surface thereof.

4. The imaging optical system according to claim 3, wherein at least one of the first meniscus lens or the second lens is formed of a plastic lens.

5. The imaging optical system according to claim 3, wherein said at least one aspheric surface used in the first meniscus lens includes an object side-convex surface area whose curvature becomes weaker with distance from an optical axis of the imaging optical system, and the aspheric surface that defines the image side-surface of the second lens includes an image side-concave surface area whose curvature becomes stronger with distance from the optical axis of the imaging optical system.

6. The imaging optical system according to claim 5, wherein the object side-surface of the second lens is defined by an aspheric surface including an object side-convex surface area whose curvature becomes weaker with distance from the optical axis of the imaging optical system.

7. The imaging optical system according to claim 1, which further satisfies the following condition:

$$0.3 < \Sigma d/f < 1.2 \quad (3)$$

where d is a distance from the aperture stop to the image side-surface of the second lens, and f is a focal length of the imaging optical system.

8. The imaging optical system according to claim 7, characterized by satisfying the following condition (3)':

$$0.5 < \Sigma d/f < 0.9 \quad (3)'$$

9. The imaging optical system according to claim 1, which further satisfies the following condition:

$$0.2 < Bf/f < 1.0 \quad (4)$$

where Bf is a length, as calculated on an air basis, from the image side-surface of the second lens to an image plane position of the imaging optical system, provided that an object point distance is taken as infinite, and f is a focal length of the imaging optical system.

10. The imaging optical system according to claim 9, which satisfies the following condition (4)':

$$0.3 < Bf/f < 0.8 \quad (4)'$$

11. The imaging optical system according to claim 1, which further satisfies the following conditions:

$$-0.2 < (r_1-r_2)/(r_1+r_2) < 0.5 \quad (5)$$

$$-4.0 < (r_3-r_4)/(r_3+r_4) < -0.4 \quad (6)$$

where:
$r_1$ is an axial radius of curvature of the object side-surface of the first meniscus lens,
$r_2$ is an axial radius of curvature of an image side-surface of the first meniscus lens,
$r_3$ is the axial radius of curvature of the object side-surface of the second lens, and
$r_4$ is the axial radius of curvature of the image side-surface of the second lens.

12. The imaging optical system according to claim 11, which satisfies the following conditions (5)' and (6)':

$$0 < (r_1-r_2)/(r_1+r_2) < 0.2 \quad (5)'$$

$$-1.1 < (r_3-r_4)/(r_3+r_4) < -0.8 \quad (6)'$$

13. The imaging optical system according to claim 1, characterized by further satisfying the following condition:

$$-2.0 < EXP/f < -0.7 \quad (7)$$

where EXP is a paraxial exit pupil position on the basis of an image-formation position where an object point distance is taken as infinite, and f is a focal length of the imaging optical system.

14. The imaging optical system according to claim 13, characterized by satisfying the following condition (7)':

$$-1.5 < EXP/f < -1.0 \quad (7)'$$

15. An imaging system, which comprises an imaging optical system as recited in claim 1 and an electronic image pickup device located on an image side thereof.

16. The imaging system according to claim 15, wherein a low-pass filter is interposed between said imaging optical system and said electronic image pickup device.

17. The imaging system according to claim 15, wherein a light ray passing through said imaging optical system and arriving at said electronic image pickup device has a maximum angle of view of at least 60°.

18. An imaging optical system, comprising an image-formation lens arrangement comprising two lenses, in order from an object side thereof, a first meniscus lens convex on an object side thereof and a second lens having positive refracting power and a convex surface on an object side thereof the convex surface being configured such that an absolute value of a curvature of an object side-surface of said second lens is larger than an absolute value of a curvature of an image side-surface of said second lens, wherein said image-formation lens arrangement has only two lens elements in all, and further including an aperture stop located on the object side of said image-formation lens arrangement, wherein the first lens is formed of an optical resin having such a property as to absorb wavelengths in a near infrared region.

19. The imaging optical system according to claim 18, wherein the first meniscus lens further satisfies the following conditions (1) and (5):

$$-0.27 \leq f_2/f_1 < 0.27 \quad (1)$$

$$-0.2 < (r_1-r_2)/(r_1+r_2) < 0.5 \quad (5)$$

where:
$f_1$ is a focal length of the first meniscus lens,
$f_2$ is a focal length of the second lens,
$r_1$ is an axial radius of curvature of the object side-surface of the first meniscus lens, and
$r_2$ is an axial radius of curvature of an image side-surface of the first meniscus lens.

20. The imaging optical system according to claim 19, wherein the object side- and image side-surfaces of the first meniscus lens are each defined by an aspheric surface convex toward the object side of the imaging optical system, whose curvature becomes weaker with distance from the optical axis of the imaging optical system.

* * * * *